United States Patent [19]

Lindahl et al.

[11] 4,033,601
[45] July 5, 1977

[54] ADJUSTABLE HITCH BALL MOUNT FOR A TRAILER HITCH

[75] Inventors: Robert F. Lindahl; Donald F. Morgan, both of Elkhart, Ind.

[73] Assignee: Masco Corporation of Indiana, Elkhart, Ind.

[22] Filed: Jan. 19, 1976

[21] Appl. No.: 650,566

[52] U.S. Cl. .................................... 280/490 R
[51] Int. Cl.² ................................... B60D 1/06
[58] Field of Search .......... 280/490 R, 490 A, 495, 280/498, 491 B, 406 A, 407, 500, 502; 403/98, 116

[56] References Cited
UNITED STATES PATENTS

| | | | |
|---|---|---|---|
| 2,161,956 | 6/1939 | Robertson | 403/98 |
| 2,847,232 | 8/1958 | Graham | 280/490 R |
| 3,035,856 | 5/1962 | Mleczko et al. | 280/490 R |
| 3,061,333 | 10/1962 | Sudeikis | 280/502 X |
| 3,254,905 | 6/1966 | Rogers et al. | 280/490 R X |
| 3,400,949 | 9/1968 | Kendall | 280/490 R |
| 3,655,221 | 4/1972 | Warner | 280/490 R |
| 3,664,686 | 5/1972 | Anderson | 280/490 R |
| 3,734,540 | 5/1973 | Thiermann | 280/490 R X |

Primary Examiner—Joseph F. Peters, Jr.
Assistant Examiner—Michael J. Forman
Attorney, Agent, or Firm—Oltsch & Knoblock

[57] ABSTRACT

An adjustable hitch ball mount for use in conjunction with a coupler connected to a trailer. The adjustable mount includes a support which is connectable to a towing vehicle. A bracket member which carries the hitch ball is shiftably connected to the support part and can be secured in a selected tilted and vertically oriented position.

5 Claims, 5 Drawing Figures

ADJUSTABLE HITCH BALL MOUNT FOR A TRAILER HITCH

SUMMARY OF THE INVENTION

This invention relates to a component of a hitch assembly utilized to connect a trailer to a towing vehicle and will have specific application to an adjustable mount for the hitch ball.

The hitch ball mount of this invention includes a support part which is adapted to be connected to the towing vehicle and which has transverse opening means formed therein. A bracket member having a channel shaped portion is fitted over the support part of the ball mount and is shiftably connected to the support part by means of first and second securement means which extend through the support part opening means. The bracket member carries the hitch ball which is positionable in a selected adjusted position, depending upon the location of the first and second securement means and the shifted position of the bracket member relative to the support part.

By utilizing the adjustable hitch ball mount of this invention, the height and angular position of the hitch ball can be adjusted to accommodate various sizes of towing vehicles and trailers as well as various types of couplers and corresponding hitch assemblies which can include load leveling and sway control bars and associated linkages. The ball mount can be detached from the towing vehicle and stored when its use is not needed. Adjusting the height and angular position of the hitch ball can be accomplished in a simple and rapid manner with the utilization of simple hand tools.

Accordingly, it is an object of this invention to provide an adjustable hitch ball mount which is of simple operation and safe use.

Still another object of this invention is to provide an adjustable hitch ball mount of economical construction and of versatile use.

Still another object of this invention is to provide an adjustable hitch ball mount having structural means for varying the height of the hitch ball as well as its angular relationship relative to the towing vehicle.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
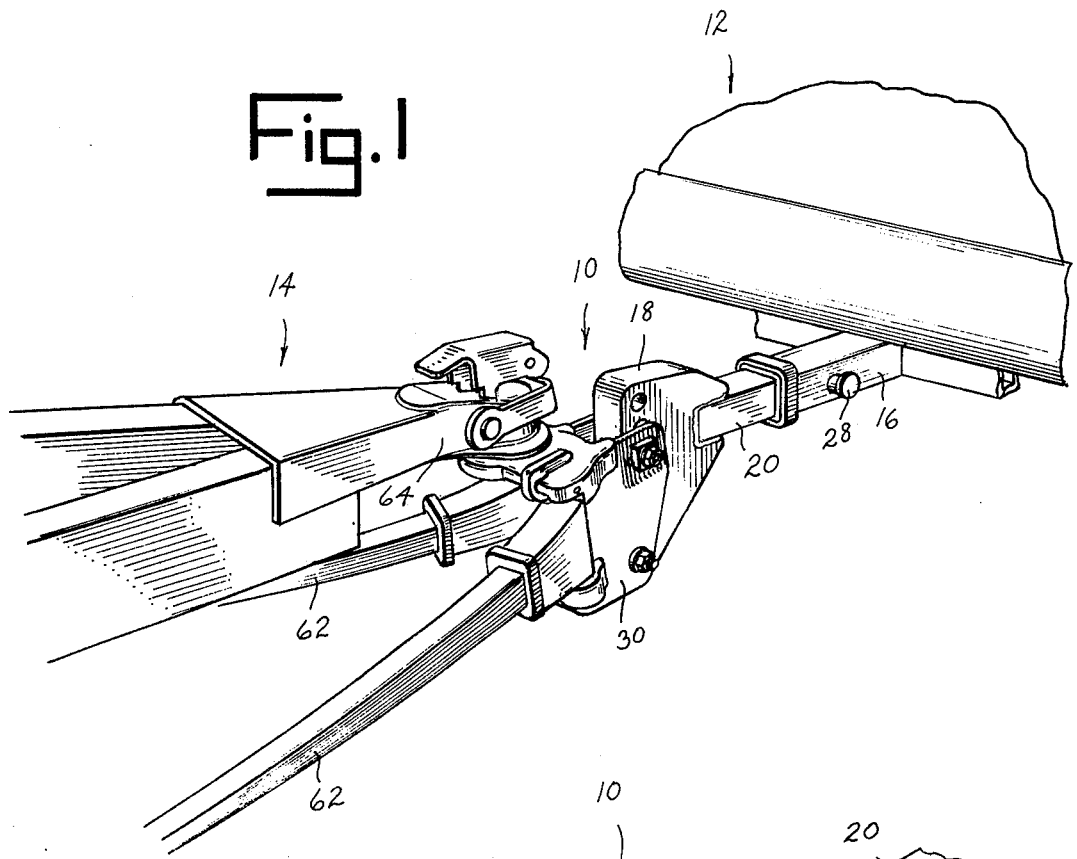
FIG. 1 is a perspective view of the hitch ball mount shown connected between a towing vehicle and trailer.
Figure 2:
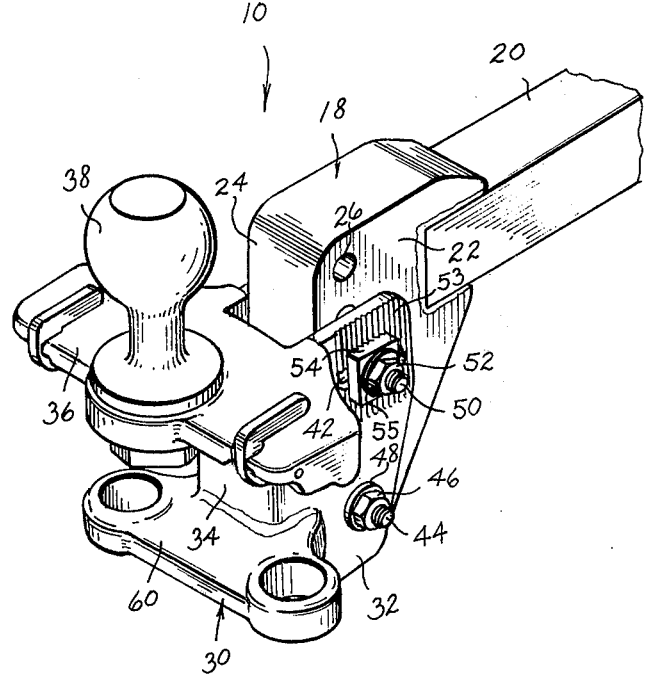
FIG. 2 is an isolated view of the hitch ball mount utilized in FIG. 1.
Figure 3:
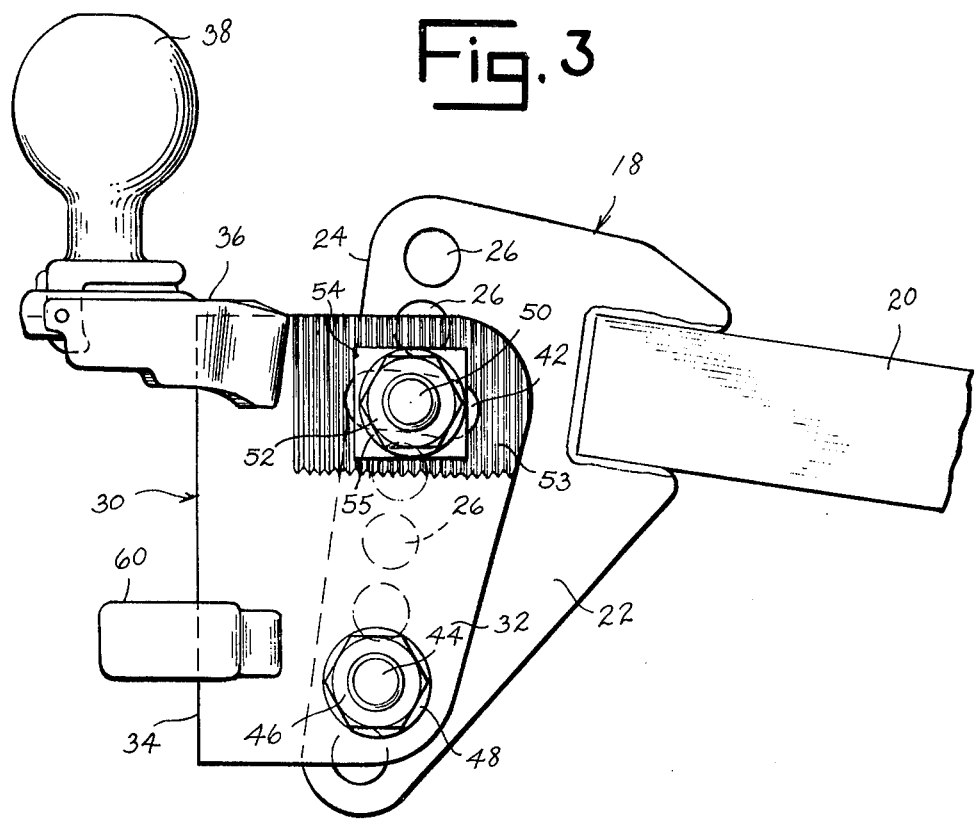
FIG. 3 is a side view of the hitch ball mount.
Figure 4:
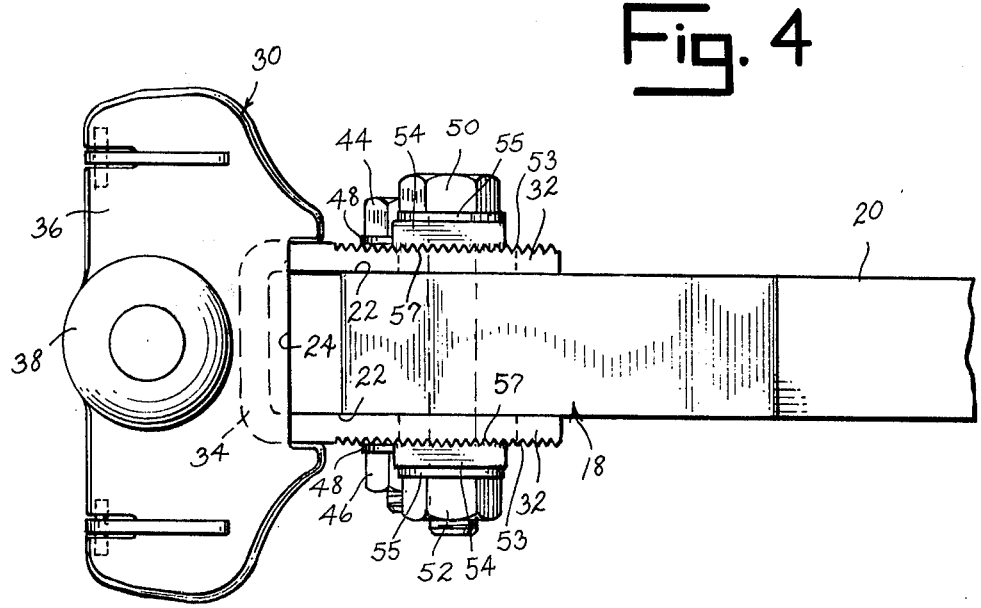
FIG. 4 is a top view of the hitch ball mount.

The hitch ball mount 10 is shown in FIG. 1 connected between a towing vehicle 12 and a trailer 14. Both the towing vehicle 12 and trailer 14 are shown in fragmentary form and can constitute any of a variety of constructions. A tubular member or hitch box 16 is secured by suitable frame means to towing vehicle 12. Mount 10 includes a thickened vertically oriented support part 18 which is attached to a hitch bar 20. Support part 18 includes parallel side faces 22 which terminate in an end edge 24 oppositely located from hitch bar 20. Support part 18 is preferably formed from a steel or similar high strength structural material and may be of cost, solid plate or a composite plate construction. A plurality of spaced vertically aligned openings 26 extend transversely through support part 18. Openings 26 extend from one side face 22 to the other side face 22 and are preferably positioned near end edge 24 of the support part. Support part 18 is connected to towing vehicle 12 by inserting bar 20 into hitch box 16. Bar 20 is locked within box 16 by means of a transverse pin 28 or similar securing means. With support part 18 so attached to towing vehicle 12, side faces 22 of the support part will generally parallel the direction of travel of the towing vehicle.

Hitch ball mount 10 also includes a bracket member 30 which is adjustably connected to support part 18. Bracket member 30 includes a U-shaped channel portion having spaced generally parallel flanges 32 interconnected by web 34. A platform 36, which constitutes a part of the bracket member, is carried by web 34 and serves to support a hitch ball 38. Each of the flanges 32 of bracket member 30 have a pair of openings 40 and 42 formed therein. Openings 40 (only one shown) in bracket member flanges 32 are horizontally aligned and are of a generally circular configuration. Openings 42 in the bracket member flanges are located above openings 40 therein and are generally horizontally aligned. Each opening 42 is of an arcuate slotted configuration formed by radii extending from the center of the adjacent lower opening 40 in the flange.

Bracket member 30 is fitted over end edge 24 of support part 18 with each of its flanges 32 closely overlying a side face 22 of the support part. Openings 40 in the bracket member flanges 32 are aligned with a selected opening 26 in the support part. A bolt 44 is inserted through openings 40 and aligned opening 26 and is retained therein by means of a nut 46. To accommodate assembly and adjustment of the mount, it is preferable to have washers 48 inserted between the head of bolt 44 and nut 46 and the bracket member flanges. Openings 40 in flanges 32 are sized so as to receive bolt 44 in a close fit to cause bracket member 30 to pivot relative to support part 18 about the bolt on a generally fixed axis when nut 46 is loosened.

The radial distance between openings 40 and 42 in each bracket member flange is such that, with bolt 44 extending through openings 40 and a support part opening 26, openings 42 can be aligned with another opening 26 in the support part. A bolt 50 is inserted through openings 42 and the aligned support part opening 26. A nut 52 is turned onto bolt 50 to secure the bolt in location. The width of each slotted opening 42 is slightly larger than the diameter of bolt 50 at its shank to allow restricted pivotal movement of bracket member 30 relative to support part 18 about bolt 44 within the limits of the ends of openings 42 when nuts 46 and 52 are loosened. This pivotal movement of bracket member 30 about bolt 44 serves to provide an angular adjustment of the hitch ball 38 carried by the bracket member. Pressure washers 55 are inserted between the head of bolt 50 and nut 52 and bracket member flanges 32.

Figure 5:
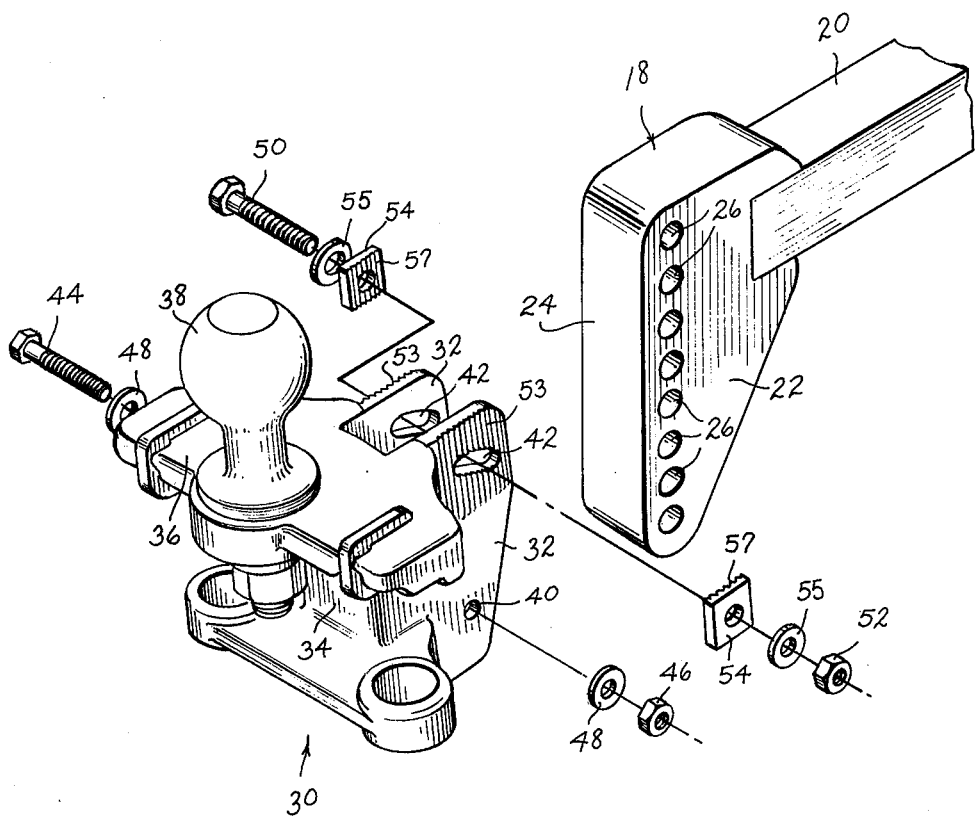
FIG. 5 is an exploded view of the component parts of the hitch ball mount.

Openings 26 in support part 18 are equally spaced apart to permit bracket member 30 to be raised and lowered relative to the support part with openings 40 and 42 in the bracket member being aligned with selected openings 26 and secured to the support part by means of bolts 44 and 50. By so aligning bracket member openings 40 and 42 with a selected pair of support part openings 26, the height of bracket member 30 and hitch ball 38 above the road surface or ground can be varied to accommodate the trailer coupler. Support part 18, as best observed in FIG. 5, is of a vertically offset oblong shape which allows the support part to be inverted or turned over and connected to hitch box 16 which is attached to towing vehicle 12. This constitutes an additional means for varying the height of hitch ball 38.

In order to secure bracket member 30 and its hitch ball 38 in a selected angular position relative to support part 18, the outer face of each bracket member flange 32 about slotted opening 42 is serrated by means of a series of elongated parallel V-shaped teeth 53. A retainer washer 54 having elongated V-shaped teeth or serrations 57 formed on one of its side faces is positioned between each washer 55 and flange 32. Upon the tightening of nut 52, the serrated faces of retainer washers 54 will be urged into complemental interlocking engagement with the serrations 53 formed upon bracket member flanges 32 so as to rigidly secure the bracket member to the support part in a selected angular position. Bolt 50 preferably extends through accommodating opening 26 in the support part in a close fit so that the adjustable movement of the bracket member relative to the support part will occur within openings 42 and not between the bolt and opening 26 in the support part. Coupler 64 carried by trailer 14 is mounted over and secured to hitch ball 38.

Bracket member 30 may be designed so as to accommodate load leveling and sway control hitch components, such as items 62 shown in FIG. 1. In such a case, the bracket member may be designed with a lower platform 60 which in combination with its upper platform 36 serves to retain one or more springs bars 62. Spring bars 62 are also secured to trailer 14 in a manner and for a purpose well known in the art. In many forms of this invention, the trailer will be connected to the hitch ball assembly solely by means of coupler 64 and hitch ball 38 without the utilization of sway control or load leveling components.

It is to be understood that the invention is not to be limited to the details above given but may be modified within the scope of the appended claims.

What we claim is:

1. An adjustable hitch ball mount for use in conjunction with a coupler connected to a trailer, said hitch ball mount comprising a support part, said support part including opposite side faces terminating in an end edge, means for attaching said support part to a towing vehicle with said support part side faces being generally vertically oriented and in general alignment with the direction of travel of the towing vehicle, said support part having a plurality of spaced parallel generally vertically aligned openings extending therethrough from one said side face to the other, a bracket including a hitch ball and a U-shaped channel part defined by spaced flanges, a first pair of aligned openings in said flanges, a second pair of aligned openings in said flanges, each second pair opening being elongated with opposite ends and located spacedly from a said first pair opening, said bracket fitted over said support part end edge and having each flange thereof overlying a side face of the support part, said first and second pairs of openings being aligned with a pair of said openings in the support part, a first bolt member extending through one of said support part pair of openings and said first pair of bracket openings, a second bolt member extending through the order of said support part pair of openings and said second pair of bracket openings, said bolt members fitting complementally within said support part pair of openings, said first bolt member constituting pivot means about which said bracket may shift relative to the support part, said second bolt member being shiftable laterally between the ends of said second pair of bracket openings to pivot said bracket about said first bolt member and to vary the angular relationship of said bracket relative to said support part whereby said hitch ball is shiftable between multiple positions, and means carried by said second bolt member and compressed against said bracket for securing said bracket in a selected angular position.

2. The hitch ball mount of claim 1 wherein said second bolt member carried means includes a washer encircling said second bolt member and positioned against a said flange of the bracket, one of said washer and last mentioned flange having a serrated face, a nut means threaded onto said second bolt member for urging said washer compressively against said last mentioned flange with said washer and flange interlocking at said serrated face.

3. The hitch ball mount of claim 2 wherein said washer has one of its side faces serrated and positioned against said last mentioned flange.

4. The hitch ball mount of claim 3 and another washer having one of its side faces serrated carried by said second bolt member and positioned with its serrated face against the other said flange of the bracket, said nut means for causing each washer to be compressed by said second bolt member against said bracket flanges.

5. The hitch ball mount of claim 4 wherein each bracket flange is serrated about said second pair of openings therein to lockingly cooperate with the serrated face of said washer.

* * * * *